US 6,637,567 B2

(12) United States Patent
Doornbos

(10) Patent No.: US 6,637,567 B2
(45) Date of Patent: Oct. 28, 2003

(54) FREE RUN CLUTCH APPARATUS

(75) Inventor: David A. Doornbos, Manteno, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/997,434

(22) Filed: Nov. 29, 2001

(65) Prior Publication Data
US 2003/0098213 A1 May 29, 2003

(51) Int. Cl.[7] .............................................. F16D 57/00
(52) U.S. Cl. ........................ 192/12 BA; 192/41 S; 188/291
(58) Field of Search ..................... 192/12 A, 12 BA, 192/41 S, 55.4, 58.4, 81 C; 188/281, 290, 291, 306, 322.5; 16/52, 82, 85

(56) References Cited

U.S. PATENT DOCUMENTS

| 4,697,673 A | * | 10/1987 | Omata | 188/291 |
| 4,830,151 A | * | 5/1989 | Numata | 188/290 |
| 4,893,522 A | * | 1/1990 | Arakawa | 74/574 |
| 5,211,269 A | * | 5/1993 | Ohshima | 188/290 |
| 5,277,282 A | * | 1/1994 | Umemura | 188/290 |
| 5,460,252 A | * | 10/1995 | Kosugi et al. | 188/291 |
| 6,309,476 B1 | * | 10/2001 | Ravenscroft et al. | 148/252 |

FOREIGN PATENT DOCUMENTS

JP 2001-317565 A * 11/2001

* cited by examiner

Primary Examiner—Richard M. Lorence
(74) Attorney, Agent, or Firm—Mark W. Croll; Paul F. Donovan

(57) ABSTRACT

A free run clutch apparatus is disclosed for damping movement of a device mechanically connected to the apparatus. The apparatus includes a housing which defines an enclosure and a rotor rotatably located within the enclosure, the rotor defining a cavity. A shaft has a first and a second end, the first end of the shaft being rotatably disposed within the cavity. A biasing device is disposed within the cavity between the first end of the shaft and the rotor. Also, a black oxide coating is coated on the biasing device such that when the shaft is rotated in a first direction, a free run of the biasing device within the cavity is permitted. However, when the shaft rotates in a second direction opposite to the first direction, the coated biasing device grabs the rotor so that damping of the rotation of the shaft in the second direction can be achieved.

20 Claims, 5 Drawing Sheets

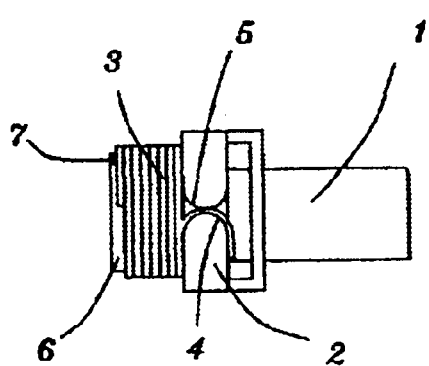
Fig. 1. *Prior art*
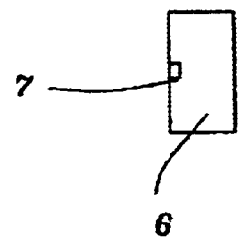
Fig. 2. *Prior art*
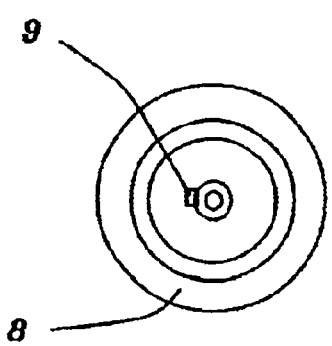
Fig. 3. *Prior art*

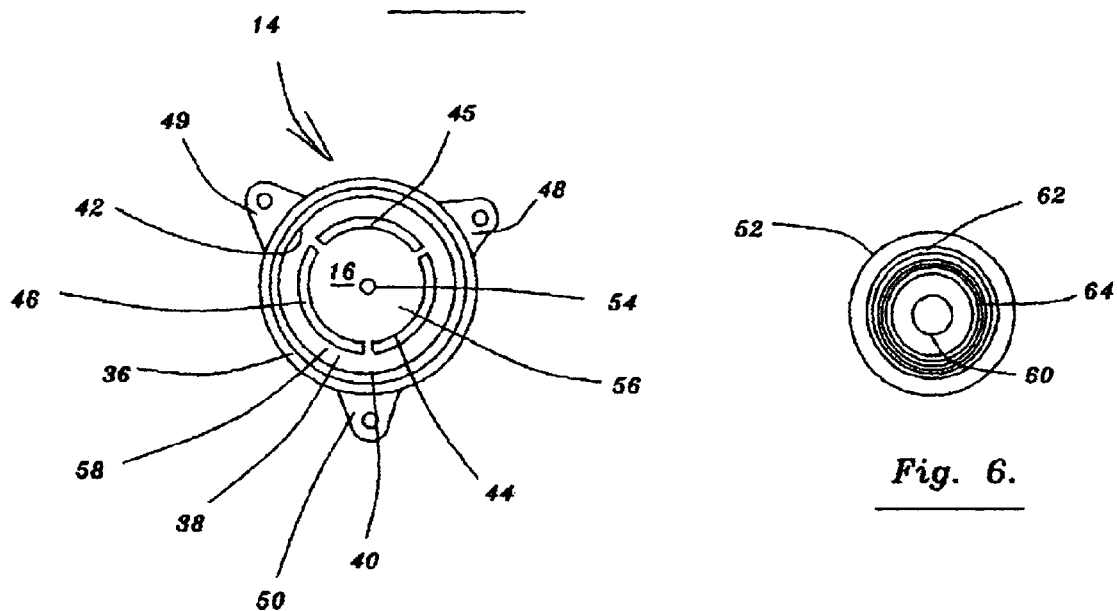
Fig. 5.
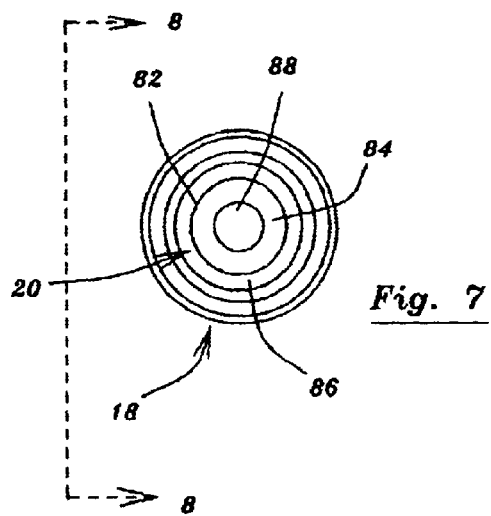
Fig. 6.
Fig. 7

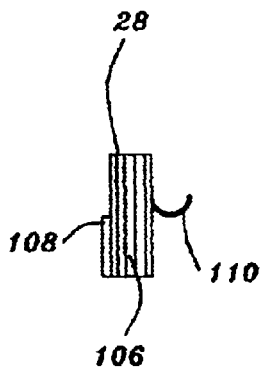
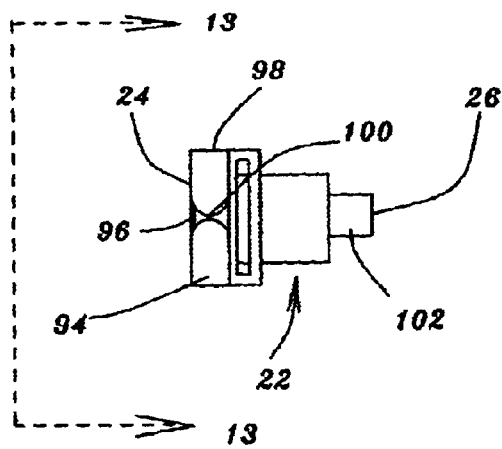

FREE RUN CLUTCH APPARATUS

FIELD OF THE INVENTION

The present invention relates to a free run clutch apparatus. More specifically, the present invention relates to a free run clutch apparatus for damping movement of a device mechanically connected to the apparatus.

BACKGROUND OF THE INVENTION

Free run clutch mechanisms have numerous applications for damping movement of a device mechanically connected to such clutch mechanism. Examples of such devices include ice maker doors for refrigerators, locker drawers, automobile ashtray lids and the like.

Such a free run clutch mechanism is extremely compact and yet provides reliable and robust dampening for a wide variety of applications.

However, because of the relatively small dimensions of the respective parts of the clutch mechanism, the assembly of the same has proved to be a labor intensive operation.

The free run clutch mechanism of the present invention greatly simplifies assembly of the mechanism and reduces the number of components required for such assembly.

Additionally, by the provision of a coating material on the spring of the clutch apparatus according to the present invention, a reduction in the generation of noise during operation of such clutch mechanism has been achieved.

Therefore, it is a feature of the present invention to provide a free run clutch mechanism that overcomes the problems associated with the prior art arrangements and which makes a considerable contribution to the art of manufacturing such a clutch mechanism.

Another feature of the present invention is the provision of a free run clutch mechanism which simplifies the assembly of such mechanism.

A further feature of the present invention is the provision of a free run clutch mechanism which has fewer parts compared to the prior art arrangements.

Another feature of the present invention is the provision of a free run clutch mechanism which is quiet in operation.

Other features and advantages of the free run clutch mechanism according to the present invention will be readily apparent to those skilled in the art by a consideration of the detailed description of a preferred embodiment of the invention contained herein.

SUMMARY OF THE INVENTION

The present invention relates to a free run clutch apparatus for damping movement of a device mechanically connected to the apparatus. The apparatus includes a housing which defines an enclosure and a rotor rotatably located within the enclosure, the rotor defining a cavity. A shaft has a first and a second end, the first end of the shaft being rotatably disposed within the cavity. A biasing device has a coating material applied thereto, the biasing device being disposed within the cavity between the first end of the shaft and the rotor such that when the shaft is rotated in a first direction, a free run of the biasing device within the cavity is permitted and when the shaft rotates in a second direction opposite to the first direction, the coated biasing device grabs the rotor so that dampening of the rotation of the shaft in the second direction can be achieved.

In a more specific embodiment of the present invention, the biasing device is a coil spring.

Also, the rotor defines a column and the coil spring expands and moves about the column when the shaft is rotated in the first direction. The coil spring contracts and tightens about the column so that the rotor can rotate when the shaft moves in the opposite second direction.

The coating material is a black oxide which is a conversion coating formed by a chemical reaction produced when the biasing device is immersed into an alkaline aqueous salt solution.

More specifically, the chemical reaction is produced when the biasing device is immersed into an oxide bath containing the salt solution in order to produce a magnetite coating on the biasing device.

Additionally, the apparatus includes a wax applied to the biasing device for assisting sliding of the biasing device within the cavity and the rotor is made from NYLON 66.

In one aspect of the present invention a damper assembly is provided for dampening movement of a device connected to the assembly. The assembly includes a coil spring coated with black oxide and a column which extends through the spring such that when the spring is rotated about the column in a first direction, the spring runs freely about the column and when the spring is rotated in a second direction opposite to the first direction about the column, the spring tightens into driving engagement with the column.

The apparatus further includes a housing which defines an enclosure and a rotor which is rotatably located within the enclosure, the rotor defining a cavity and the column. A shaft has a first and a second end, the first end of the shaft being rotatably disposed within the cavity. The spring is disposed within the cavity between the first end of the shaft and the rotor such that when the shaft is rotated in a first direction, a free run of the spring within the cavity is permitted and when the shaft rotates in a second direction opposite to the first direction, the coated spring grabs the rotor so that dampening of the rotation of the shaft in the second direction can be achieved.

The housing includes a first portion of cup-shaped configuration, the first portion having a base and a peripheral wall which extends from the base, the wall defining an internal cylindrical surface. A plurality of partitions extend from the base and are disposed within the enclosure, the plurality of partitions being disposed concentrically relative to the internal cylindrical surface. A plurality of anchoring ears extend radially away from the wall for anchoring the housing.

A second portion of cap-shaped configuration cooperates with the first portion for defining the enclosure so that the rotor is disposed between the first and second portions. The first portion further includes a central boss which extends from the base and is disposed concentrically relative to the plurality of partitions and the internal cylindrical surface for locating the rotor within the enclosure.

Moreover, the rotor includes a central member which defines a central aperture for the rotatable reception therein of the boss.

Additionally, the black oxide is a conversion coating formed by a chemical reaction produced when the biasing device is immersed into a hot alkaline aqueous salt solution. The chemical reaction is produced when the biasing device is immersed into an oxide bath containing the salt solution in order to produce a magnetite coating on the biasing device.

Also, a wax is applied to the spring for assisting sliding of the spring about the column.

In a further aspect of the present invention, a free run clutch apparatus for damping movement of a device mechanically connected to the apparatus includes a housing which defines an enclosure and a rotor rotatably located within the enclosure, the rotor defining a cavity. A shaft has a first and a second end, the first end of the shaft being rotatably disposed within the cavity. A biasing device has a black oxide coating material applied thereto, the biasing device being disposed within the cavity between the first end of the shaft and the rotor such that when the shaft is rotated in a first direction, a free run of the biasing device within the cavity is permitted. When the shaft rotates in a second direction opposite to the first direction, the coated biasing device grabs the rotor so that damping of the rotation of the shaft in the second direction can be achieved.

More particularly, the biasing device is a coil spring and the rotor defines a column. The coil spring expands and moves about the column when the shaft is rotated in the first direction. The coil spring contracts and is tightened about the column so that the rotor can rotate when the shaft moves in the opposite second direction.

The black oxide coating material is a conversion coating formed by a chemical reaction produced when the biasing device is immersed into a hot alkaline aqueous salt solution. The chemical reaction is produced when the biasing device is immersed into an oxide bath containing the salt solution in order to produce a magnetite coating on the biasing device.

Also, a wax is applied to the biasing device for added lubricity and rust protection and the rotor is made from NYLON 66.

The housing includes a first portion of cup-shaped configuration, the first portion having a base and a peripheral wall which extends from the base, the wall defining an internal cylindrical surface. A plurality of partitions extend from the base and are disposed within the enclosure, the plurality of partitions being disposed concentrically relative to the internal cylindrical surface. A plurality of anchoring ears extend radially away from the wall for anchoring the housing. A second portion of cap-shaped configuration cooperates with the first portion for defining the enclosure so that the rotor is disposed between the first and second portions.

The apparatus further includes a viscose dampening fluid disposed within the enclosure such that when the spring is tightened for driving the rotor, the dampening fluid dampens the movement of the rotor and the device mechanically connected to the apparatus. The fluid is a temperature stable viscous silicone fluid.

Additionally, the first end of the shaft defines a head. The bead includes an end face which rides on the column. A skirt portion extends from the end face, so that the skirt portion is slidably disposed within the cavity, the skirt portion defining a guide for guiding the biasing device. The second end of the shaft defines a keyed portion.

The coil spring has a first and a second extremity, the first extremity cooperating with the annular receptacle. The second extremity of the spring cooperates with the guide so that rotation of the shaft in the first direction slidably drives the first extremity of the spring against the cylindrical face of the cavity and when the shaft is rotated in the second direction, the first extremity of the spring cooperates with the cylindrical face thereby grabbing the cylindrical face so that the spring is tightened into driving engagement with the cylindrical face for rotating the rotor within the enclosure.

Furthermore, the second portion defines a bore for the rotatable reception therethrough of the shaft the second portion also defining an annular groove. An annular seal cooperates with the annular groove and the rotor when the first and second portions are assembled.

Also, a gear is secured to the second end of the shaft for cooperation with a mating gear on the device to be dampened.

Other features and advantages of the invention will become apparent to those skilled in the art upon review of the following detailed description, claims and drawings in which like numerals are used to designate like features.

BRIEF DESCRIPTION OF THE DRAWINGS

FIG. 1 is a side elevational view of a prior art free run clutch mechanism.

FIG. 2 is a side elevational view of a prior art metal sleeve which is wrapped by the spring shown in FIG. 1.

FIG. 3 is an end view of a prior art rotor which receives the spring and the sleeve shown in FIG. 1.

FIG. 5 is a view taken on the line 5—5 of FIG. 4.

FIG. 6 is a view taken on the line 6—6 of FIG. 4.

FIG. 7 is a view taken on the line 7—7 of FIG. 4.

FIG. 10 is a view taken on the line 10—10 of FIG. 4.

FIG. 11 is a view taken on the line 11—11 of FIG. 10.

FIG. 12 is a side elevational view of the biasing device shown in FIG. 4.

FIG. 13 is a view taken on the line 13—13 of FIG. 11.

Figure 4:
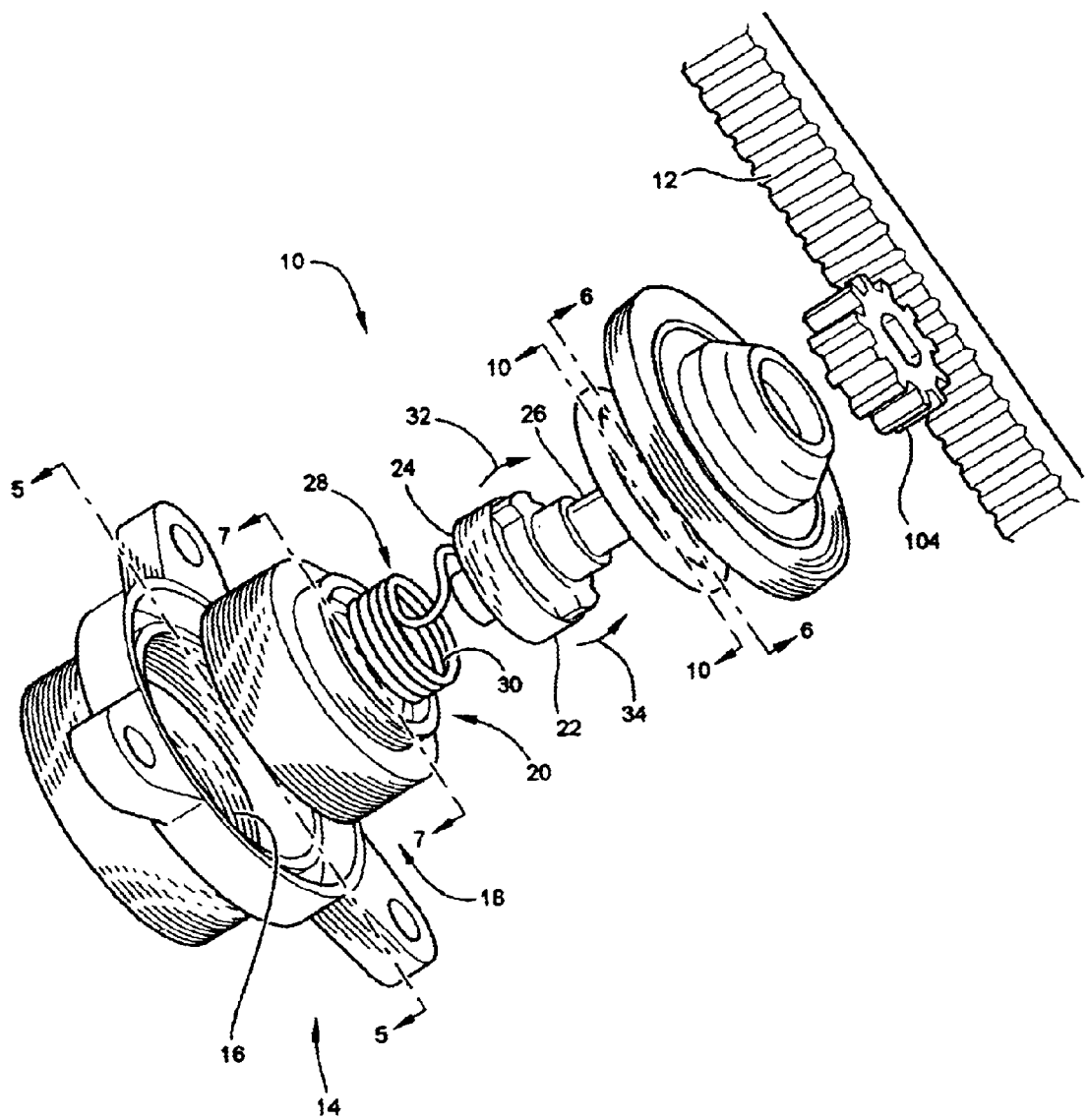
FIG. 4 is a perspective view of a free run clutch apparatus according to the present invention.

Before the embodiments of the invention are explained in detail, it is to be under stood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

FIG. 1 is a side elevational view of a prior art free run clutch mechanism which includes a shaft 1 having a head 2. A spring 3 is attached at a first end 4 thereof to a guide 5 defined by the head 2.

FIG. 2 is a side elevational view of a prior art metal sleeve 6 which is wrapped by the spring 3 shown in FIG. 1. The sleeve 6 includes a slot 7.

FIG. 3 is an end view of a prior art rotor 8 which receives the spring 3 and the sleeve 6 shown in FIG. 1. The rotor 8 includes a stop 9 which engages the slot 7 of the sleeve 6 so that rotation of the sleeve 6 relative to the rotor 8 is inhibited. When the shaft 1 is rotated in a first direction, the spring 3 slides on the sleeve 6. However when the shaft 1 is rotated in an opposite direction, the spring 3 tightens around the sleeve 6 so that the rotor 8 is driven via the slot 7 and the stop 9.

FIG. 4 is a perspective view of a free run clutch apparatus generally designated 10 according to the present invention for damping movement of a device 12 mechanically connected to the apparatus 10. As shown in FIG. 4, the apparatus 10 includes a housing generally designated 14 which defines an enclosure 16 and a rotor generally designated 18 rotatably located within the enclosure 16. The rotor 18 defines a cavity generally designated 20. A shaft 22 has a first and a second end 24 and 26 respectively, the first end 24 of the shaft 22 being rotatably disposed within the cavity 20. A biasing device generally designated 28 is disposed within the cavity 20 between the first end 24 of the shaft 22 and the rotor 18. Also, a coating material 30, preferably a black oxide coating material, is coated on the biasing device 28 such that when the shaft 22 is rotated in a first direction as indicated by the arrow 32, a free run of the biasing device 28 within the cavity 20 is permitted. However, when the shaft 22 rotates in a second direction as indicated by the arrow 34 opposite to the first direction 32, the coated biasing device 28 grabs the rotor 18 so that damping of the rotation of the shaft 22 in the second direction 34 can be achieved.

FIG. 5 is a view taken on the line 5—5 of FIG. 4. As shown in FIG. 5, the housing 14 includes a first portion 36 of cup-shaped configuration, the first portion 36 having a base 38 and a peripheral wall 40 which extends from the base 38, the wall 40 defining an internal cylindrical surface 42.

A plurality of partitions 44, 45 and 46 extend from the base 38 and are disposed within the enclosure 16 such that the partitions 44–46 are disposed concentrically relative to the surface 42. Also, a plurality of anchoring ears 48, 49 and 50 extend radially away from the wall 40 for anchoring the housing 14.

FIG. 6 is a view taken on the line 6—6 of FIG. 4. As shown in FIG. 6, the housing 14 includes a second portion 52 of cap-shaped configuration, the second portion 52 cooperating with the first portion 36 for defining the enclosure 16 so that the rotor 18 is disposed between the first and second portions 36 and 52 respectively.

Moreover, as shown in FIG. 5, the first portion 36 further includes a central boss 54 which extends from the base 38 and is disposed concentrically relative to the plurality of partitions 44–46 and the surface 42 for locating the rotor 18 within the enclosure 16.

Furthermore, the partitions 44–46 divide the enclosure 16 into a first and a second chamber 56 and 58 respectively, the second chamber 58 being of annular configuration, the second chamber 58 extending concentrically around the first chamber 56.

The first and second portions 36 and 52 respectively are preferably ultrasonically welded to each other after insertion therein of the rotor 18, shaft 22 and biasing device 28.

As shown in FIG. 6, the second portion 52 defines a bore 60 for the rotatable reception therethrough of the shaft 22, the second portion 52 also defining an annular groove 62. An annular seal 64 cooperates with the annular groove 62 and the rotor 18 when the portions 36 and 52 respectively are assembled.

FIG. 7 is a view taken on the line 7—7 of FIG. 4. As shown in FIG. 7, the rotor 18 defines the cavity 20.

Figure 8:
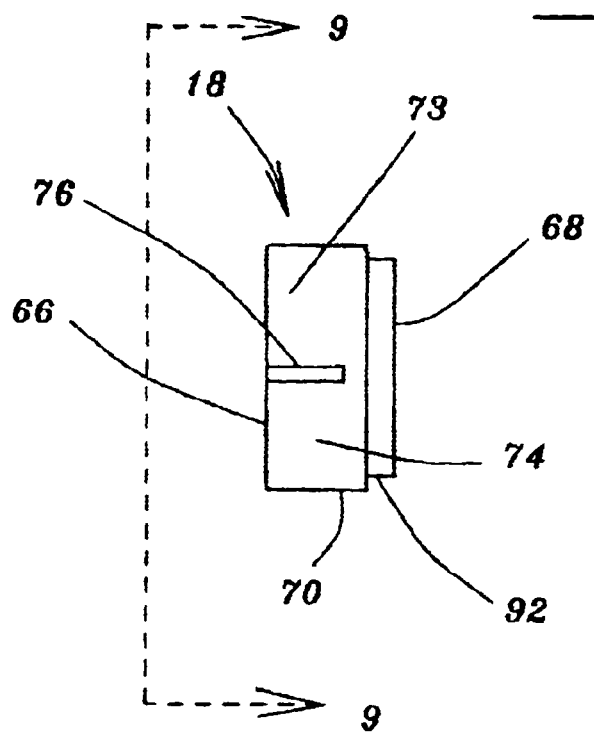
FIG. 8 is a view taken on the line 8—8 of FIG. 7.

FIG. 8 is a view taken on the line 8—8 of FIG. 7. As shown in FIG. 8, the rotor 18 is of generally cylindrical configuration and has a first and a second end 66 and 68 respectively. The rotor 18 defines a cylindrical outer surface 70 which slidably cooperates with the internal cylindrical surface 42 of the wall 40.

Figure 9:
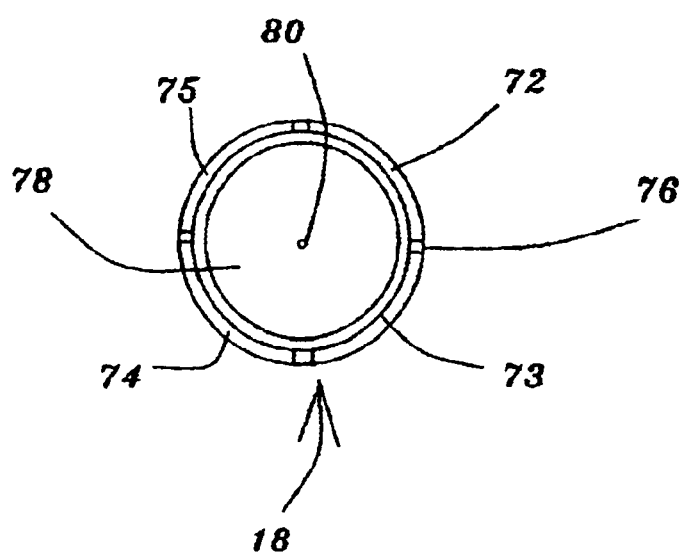
FIG. 9 is a view taken on the line 9—9 of FIG. 8.

FIG. 9 is a view taken on the line 9—9 of FIG. 8. As shown in FIG. 9, the rotor 18 includes a plurality of vanes 72, 73, 74 and 75 which extend from the second end 68 of the rotor 18, the vanes 72–75 being disposed within the second chamber 58. Each vane such as vane 72 is separated from an adjacent vane 73 by a slot 76 which extends from the first end 66 of the rotor 18 towards the second end 68 of the rotor 18.

Also, the rotor 18 includes a central member 78 which defines a central aperture 80 for the rotatable reception therein of the boss 54.

As shown in FIG. 7, the cavity 20 is of cylindrical configuration and defines a cylindrical face 82 which cooperates with the biasing device 28. Additionally, the rotor 18 further includes an annular divider or column 84 which divides the cavity 20 into an annular receptacle 86 and a central receptacle 88, the annular receptacle 86 receiving therein the biasing device 28.

Moreover, as shown in FIG. 8, the rotor 18 defines an annular ridge 92 which cooperates with the annular seal 64.

FIG. 10 is a view taken on the line 10—10 of FIG. 4. As shown in FIG. 10, the shaft 22 is dimensioned to cooperate with the cavity 20.

FIG. 11 is a view taken on the line 11—11 of FIG. 10. As shown in FIG. 11, the first end 24 of the shaft 22 defines a head 94. The head 94 includes an end face 96 which rides on the annular divider or column 84. A skirt portion 98 extends from the end face 96, so that the skirt portion 98 is slidably disposed within the cavity 20. The skirt portion 98 defines a guide for guiding the biasing device 28. Also, the second end 26 of the shaft 22 defines a keyed portion 102 on which a gear wheel 104 is mounted as shown in FIG. 4.

FIG. 12 is a side elevational view of the biasing device 28 shown in FIG. 4. As shown in FIG. 12, the biasing device 28 is a coil spring 106 having a first and a second extremity 108 and 110 respectively. The first extremity 108 of the spring 106 cooperates with the annular receptacle 86 shown in FIG. 7. The second extremity 110 of the spring 106 cooperates with the guide shown in FIG. 11, so that rotation of the shaft 22 in the first direction 32 slidably drives the first extremity 108 of the spring 106 within the cavity 20 and when the shaft 22 is rotated in the second direction 34, the first extremity 108 of the spring 106 and the rest of the spring is tightened against the cylindrical face 82 thereby grabbing the cylindrical face 82 so that the spring 106 is tightened up or closed into driving engagement with the cylindrical face 82 for rotating the rotor 18 within the enclosure 16.

FIG. 13 is a view taken on the line 13—13 of FIG. 11. As shown in FIG. 13, the head 94 defines the end face 96.

Additionally, the apparatus further includes a viscose dampening fluid (not shown) which is disposed within the enclosure 16 when sealed such that when the spring 106 is tightened for driving the rotor 18, the dampening fluid dampens the movement of the rotor 18 and the device 12 mechanically connected to the apparatus 10. Preferably, the fluid is a temperature stable viscous silicone fluid. Also, the rotor 18 is fabricated from NYLON 66.

Furthermore, a wax (not shown) is applied to the biasing device 28 for assisting sliding of the biasing device 28 within the cavity 20 or more specifically, the annular receptacle 86.

The black oxide coating 30 is a conversion coating formed by a chemical reaction produced when the biasing device 28 is immersed into a hot alkaline aqueous salt solution.

The chemical reaction is produced when the biasing device 28 is immersed into an oxide bath containing the salt solution in order to produce a magnetite coating on the biasing device 28.

One particular black oxide coating that is suitable for use according to the present invention is available from SWD Inc. of Addison, Illinois. Also, one particular wax as described for the biasing device that is suitable for use according to the present invention is produced by the same company under the name Plasti-Kote # 5. Alternatively, other black oxide coatings or other suitable coatings as well as other waxes can be used according to the present invention, so long as the principles of the invention can be accomplished.

The strength of the dampening is a function of the viscosity of the damping medium or fluid and the spacing between the cooperating surfaces.

The rotor 18 is fabricated from NYLON 66 manufactured by DuPont and is compatible with the black oxide coating.

The black oxide coating negates any need for a metal sleeve characteristic of the prior art mechanism. Additionally, such black oxide coating makes special lubrication of the spring unnecessary although wax may be applied optionally to the spring of the present invention.

Also, the shaft, rotor and first and second portions of the housing are manufacture by injection molding techniques.

Thus, the free run clutch apparatus according to the present invention provides an arrangement which is extremely easy to assemble when compared to the prior art arrangement. Also, there is no need in the present invention to provide a stop at the bottom of the cavity as required in the prior art arrangement and consequently, no need in assembly to carefully align such stop with the prior art slot.

In operation of the apparatus according to the present invention, the spring 106 is coated with black oxide 30 as described hereinbefore. The second extremity 110 of the spring 106 is attached to the head 94 by locating the second extremity 110 within the guide 100. The spring 106 is then guided into the annular receptacle 86 until the face 96 rides on the divider or column 84. Such sub-assembly is then fitted into the first portion 36 and the first portion is filled with dampening fluid. The second portion 52 is then located with the seal 64 sealing the rotor 18 so that dampening fluid is retained within the housing.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A free run clutch apparatus for damping movement of a device mechanically connected to said apparatus, said apparatus comprising:

a housing defining an, enclosure;

a rotor rotatably located within said enclosure, said rotor defining a cavity;

a shaft having a first and a second end, said first end of said shaft being rotatably disposed within said cavity; and a biasing device having a coating material applied thereto, said biasing device having a first extremity and a second extremity. said second extremity being attached to said first end of said shaft, said biasing device being disposed within said cavity between said first end of said shaft and said rotor such that when said shaft is rotated in a first direction, a free run of said biasing device within said cavity is permitted and when said shaft rotates in a second direction opposite to said first direction, said coated biasing device grabs said rotor so that dampening of said rotation of said shaft in said second direction can be achieved.

2. A free run clutch apparatus as set forth in claim 1, wherein said biasing device is a coil spring.

3. A free run clutch apparatus as set forth in claim 2, wherein said rotor defines a column, said coil spring expanding and moving about said column when said shaft is rotated in said first direction, said coil spring contracting and tightening about said column so that said rotor can rotate when said shaft moves in said opposite second direction.

4. A free run clutch apparatus as set forth in claim 1, wherein said coating material is a black oxide which is a conversion coating formed by a chemical reaction produced when said biasing device is immersed into an alkaline aqueous salt solution.

5. A free run clutch apparatus as set forth in claim 4, wherein said chemical reaction is produced when said biasing device is immersed into an oxide bath containing said hot salt solution in order to produce a magnetite coating on said biasing device.

6. A free run clutch apparatus as set forth in claim 1, wherein said coating material is a black oxide coating material.

7. A free run clutch apparatus as set forth in claim 1, wherein said apparatus further includes:

a wax applied to said.biasing device for additional lubricity and rust protection.

8. A free run clutch apparatus as set forth in claim 1, wherein said rotor is made from NYLON 66.

9. A damper assembly for dampening movement of a device connected to said assembly, said assembly comprising:

a housing defining an enclosure:

a rotor rotatable located within said enclosure, said rotor defining a cavity and a column;

a shaft having a first and a second end. said first end of said shaft being rotatable disposed within said cavity: and a coil spring coated with black oxide, said spring having a first extremity and a second extremity, said second extremity being attached to said first end of said shaft;

a wherein said column extends through said spring such that when said spring is rotated about said column in a first direction, said spring runs freely about said column and when said spring is rotated in a second direction opposite to said first direction about said column, said spring tightens into driving engagement with said column.

10. A free run clutch apparatus as set forth in claim 9, wherein:

said spring being disposed within said cavity between said first end of said shaft and said rotor such that when said shaft is rotated in a first direction, a free run of said spring within said cavity is permitted and when said shaft rotates in a second direction opposite to said first direction, said coated spring grabs said rotor so that dampening of said rotation of said shaft in said second direction can be achieved.

11. A free run clutch apparatus as set forth in claim 10, wherein said housing includes:
   a first portion of cup-shaped configuration, said first portion having a base and a peripheral wall extending from said base, said wall defining an internal cylindrical surface;
   a plurality of partitions extending from said base and disposed within said enclosure, said plurality of partitions being disposed concentrically relative to said internal cylindrical surface;
   a plurality of anchoring ears extending radially away from said wall for anchoring said housing;
   a second portion of cap-shaped configuration, said second portion cooperating with said first portion for defining said enclosure so that said rotor is disposed between said first and second portions;
   said first portion further including:
      a central boss extending from said base and disposed concentrically relative to said plurality of partitions and said internal cylindrical surface for locating said rotor within said enclosure.

12. A free run clutch apparatus as set forth in claim 11, wherein said rotor includes:
   a central member which defines a central aperture for the rotatable reception therein of said boss.

13. A free run clutch apparatus as set forth in claim 9, wherein said black oxide is a conversion coating formed by a chemical reaction produced when said biasing device is immersed into an alkaline aqueous salt solution.

14. A free run clutch apparatus as set forth in claim 13, wherein said chemical reaction is produced when said biasing device is immersed into an oxide bath containing said salt solution in order to produce a magnetite coating on said biasing device.

15. A free run clutch apparatus as set forth in claim 9, wherein said apparatus further includes:
   a wax applied to said spring for assisting sliding of said spring about said column.

16. A free run clutch apparatus for damping movement of a device mechanically connected to said apparatus, said apparatus comprising:
   a housing defining an enclosure;
   a rotor rotatably located within said enclosure, said rotor defining a cavity and a column;
   a shaft having a first and a second end, said first end of said shaft being rotatably disposed within said cavity;
   a biasing device having a black oxide coating material applied thereto, said biasing device having a first extremity and a second extremity, said second extremity being attached to said first end of said shaft, said biasing device being disposed within said cavity between said first end of said shaft and said rotor such that when said shaft is rotated in a first direction, a free run of said biasing device within said cavity is permitted and when said shaft rotates in a second direction opposite to said first direction, said coated biasing device grabs said rotor so that damping of said rotation of said shaft in said second direction is achieved, said biasing device being a coil spring, said coil spring expanding and moving about said column when said shaft is rotated in said first direction, said coil spring contracting and tightening about said column so that said rotor can rotate when said shaft moves in said opposite second direction;
   said black oxide coating material being a conversion coating formed by a chemical reaction produced when said biasing device is immersed into an alkaline aqueous salt solution;
   said chemical reaction being produced when said biasing device is immersed into an oxide bath containing said salt solution in order to produce a magnetite coating on said biasing device;
   said coating material being a black oxide coating material;
   said apparatus further including:
      a wax applied to said biasing device for additional lubricity and rust protection; and
      said rotor being made from NYLON 66.

17. A free run clutch apparatus as set forth in claim 16, wherein said housing includes:
   a first portion of cup-shaped configuration, said first portion having a base and a peripheral wall extending from said base, said wall defining an internal cylindrical surface;
   a plurality of partitions extending from said base and disposed within said enclosure, said plurality of partitions being disposed concentrically relative to said internal cylindrical surface;
   a plurality of anchoring ears extending radially away from said wall for anchoring said housing;
   a second portion of cap-shaped configuration, said second portion cooperating with said first portion for defining said enclosure so that said rotor is disposed between said first and second portions;
   said apparatus further including:
      a viscose dampening fluid disposed within said enclosure such that when said spring is tightened for driving said rotor, said dampening fluid dampens the movement of said rotor and the device mechanically connected to said apparatus;
      said fluid being a temperature stable viscous silicone fluid.

18. A free run clutch apparatus as set forth in claim 17, wherein said first end of said shaft defines a head, said head including an end face which rides on said column, a skirt portion extending from said end face, so that said skirt portion is slidably disposed within said cavity, said skirt portion defining a guide for guiding said biasing device, said second end of said shaft defining a keyed portion, said coil spring having a first and a second extremity, said first extremity cooperating with said annular receptacle, said second extremity of said spring cooperating with said guide so that rotation of said shaft in said first direction slidably drives said first extremity of said spring against said cylindrical face of said cavity and when said shaft is rotated in said second direction, said first extremity of said spring cooperates with said cylindrical face thereby grabbing said cylindrical face so that said spring is tightened into driving engagement with said cylindrical face for rotating said rotor within said enclosure.

19. A free run clutch apparatus as set forth in claim 17, wherein said second portion defines a bore for the rotatable reception therethrough of said shaft said second portion also defining an annular groove, and said clutch apparatus further including an annular seal which cooperates with said annular groove and said rotor when said first and second portions are assembled.

20. A free run clutch apparatus as set forth in claim 19, further including:
   a gear secured to said second end of said shaft for cooperation with a mating gear on the device to be dampened.

* * * * *